United States Patent [19]

Bryer

[11] 4,208,682
[45] Jun. 17, 1980

[54] POSITIONER CONE FOR FLEXIBLE DISKS

[75] Inventor: Philip S. Bryer, Woodland Hills, Calif.

[73] Assignee: PerSci, Inc., Los Angeles, Calif.

[21] Appl. No.: 947,753

[22] Filed: Oct. 2, 1978

[51] Int. Cl.² ................. G11B 5/06; G11B 25/04; G11B 17/02
[52] U.S. Cl. ........................................ 360/99; 360/86
[58] Field of Search ................. 360/99, 97, 86, 135, 360/133, 137; 274/9 B, 105, 40; 346/137

[56] References Cited

U.S. PATENT DOCUMENTS

| 3,898,814 | 8/1975 | Chou et al. | 360/99 |
| 4,040,106 | 8/1977 | Medley | 360/99 |
| 4,040,107 | 8/1977 | Bryer | 360/99 |
| 4,089,029 | 5/1978 | Castrodale et al. | 360/99 |
| 4,125,883 | 11/1978 | Rolph | 360/99 |

FOREIGN PATENT DOCUMENTS

| 2330818 | 1/1974 | Fed. Rep. of Germany | 360/99 |
| 2659642 | 7/1977 | Fed. Rep. of Germany | 360/99 |

OTHER PUBLICATIONS

IBM Tech. Disc. Bull., W. E. Beuch et al., Spider Collet for Flexible Magnetic Disks, vol. 20, No. 6, Nov. 1977, pp. 2376-2377.

Primary Examiner—Alfred H. Eddleman
Attorney, Agent, or Firm—Smyth, Pavitt, Siegemund, Jones & Martella

[57] ABSTRACT

A three part cone member assembly is provided for positioning a flexible disk on a drive hub. The three parts are, a disk with annularly arranged apertures, a plastic trunketed cone established by oblique arms and feet which stick in the apertures thereby determining the cones geometry; the third part is a metallic member with resilient arms, positioned in the plastic cone whereby each metal spring arm urges a plastic arm against the outer surface of the respective aperture.

6 Claims, 3 Drawing Figures

U.S. Patent   Jun. 17, 1980   4,208,682
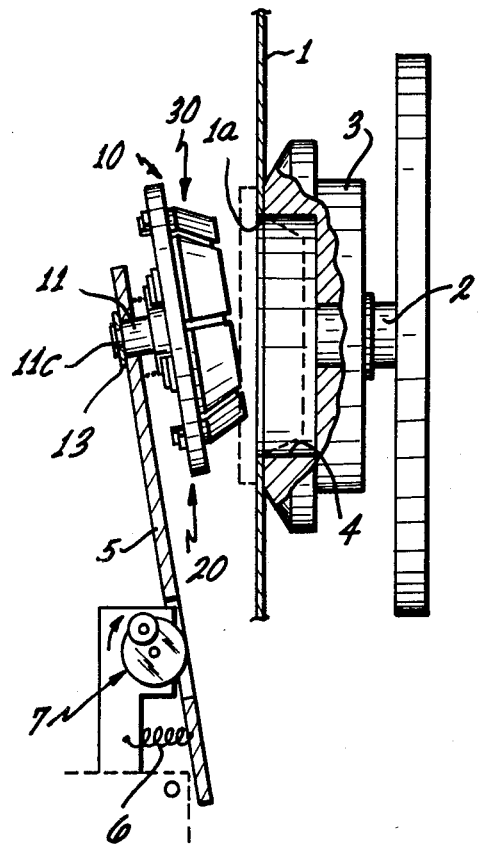
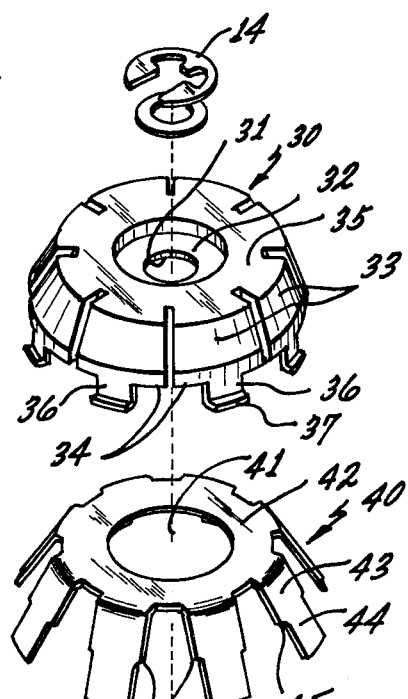
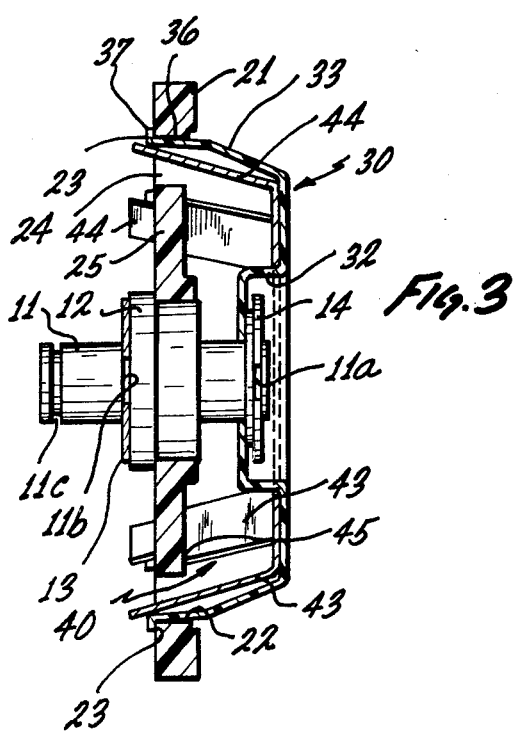
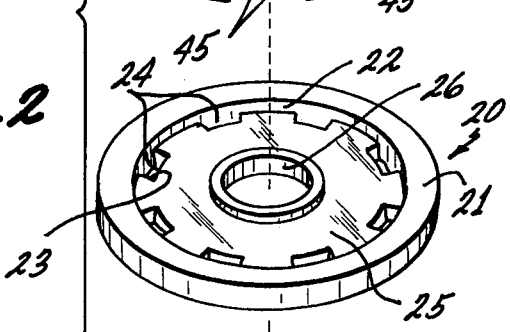
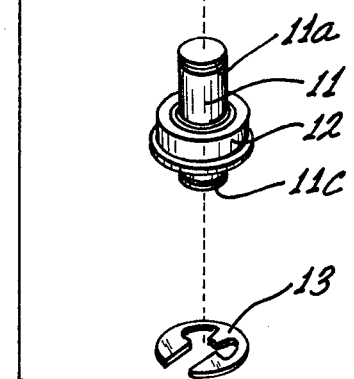
Fig.1
Fig.2
Fig.3

POSITIONER CONE FOR FLEXIBLE DISKS

BACKGROUND OF THE INVENTION

The present invention relates to a positioning cone structure in drives for flexible disks.

Flexible disks with a magnetizable surface increasingly used as small scale bulk storage facility and memory extension in small computers, mini-computers, controllers with computing (microprocessing) facilities etc. The disks are to be removeably positioned and mounted on a hub for ready replacement or exchange. The flexibility of such a disk is one of its advantages as far as magnetic interaction with read and write transducers is concerned; however, the same flexibility poses mounting problems because the data tracks on the disk must be positioned and mounted in precise concentric relation to the axis of the disk drive and its hub. The hub is a rather precisely machined part and cooperates with a retractible, spring-biased positioner cone for sandwiching the flexible disk in between. The positioner cones used here are made of plastic and provide for a resilient reaction in radial direction upon clamping the disk against the hub. This resilient reaction of such a positioning member as cooperating e.g. with the driving hub must be a uniform one around its periphery to avoid excentric behavior during running. Thus far, the available positioning cones are deficient in that respect.

SUMMARY OF THE INVENTION

It is an object of the present invention to provide a new and improved positioning structure for accurate and concentric positioning a flexible disk on a driving hub.

In accordance with the preferred embodiment of the present invention, it is suggested to provide the positioner as an assembly of three major compoents; a molded plastic disk with apertures each having one outer wall and the outer walls delineate accurately a circle; a molded plastic truncated cone member having individual oblique arms with feet that fit into the apertures and are retained therein; and a metal cone member in the plastic cone member having individual spring arms radially aligned with the arms of the plastic cone member whereby each metal arm urges a plastic member arm into engagement with the aperture wall on that circle; the resiliency of such urging is primarily provided by the respective metal arm. The spring constant of each metal arm is much more accurately determinable merely by the dimensions of the arm than is possible with a molded piece of plastic. On the other hand, the geometry and desired contour dimensions are determined by the disk and the location of its apertures. In combination these parts provide for accurate positioning of a flexible disk.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a section and side view of a driving and mounting assembly for a flexible disk including the disk positioning assembly in accordance with the preferred embodiment of the invention;

FIG. 2 is an exploded view of the positioning assembly when disassembled; and

FIG. 3 is a cross-section through the assembled positioner.

Proceeding now to the detailed description of the drawings, FIG. 1 shows the environment for the novel disk positioner. A flexible disk 1 with an aperture 1a is to be mounted concentric to a shaft 2 of a drive motor (not shown). The shaft carries a hub or flange member 3 serving also as fly wheel to reduce any flutter. The hub 3 has a cylindrical bore 4 whose outer edge defines a positioning circle which is very accurately concentrical to the driving axis.

The novel positioner or hub 10 is journalled on an axle pin 11 which is mounted to a pivot arm 5. The arm 5 is resiliently biased by a spring 6 towards a retracted position of the positioner as illustrated in FIG. 1. However, a cam device 7 pivots the arm 5 clockwise so that the hub 10 assumes the dotted position, engaging the disk 1 and urging it into driving engagement with the flange or hub 3. An arm pivoting and actuating mechanism is disclosed, for example, in my U.S. Pat. No. 4,040,107.

The hub or positioner 10 is an assembly of several elements, each shown in detail in FIG. 2, resulting in an assembly shown in FIG. 3. The base support and first major component for the positioner is a disk 20 having a rim 21 whose inner surface 22 defines very accurately a cylinder. The bottom or base part 25 of disk 20 is provided with a plurality of slots 24, each bounded on one side by a portion of the cylindrical surface 22 which appears continued in each aperture as one of the surfaces thereof. The portions of surface 22 of the apertures 24 end in edge 23 and all the edges define very accurately a particular circle. The surface 22 and the edge portions 23 thereof as located on that circle determine the geometry of the positioner. Member 20 is a molded plastic part.

Disk 20 has a central aperture 26 into which is placed an annular bearing member 12. The axle pin 11 is journalled in member 12 by means of ball bearings. The member 12 sits in the central aperture 26 in press fit, and the bearing axis is precisely concentrical to the axis of cylinder surface 22 and the circle as determined by the edges 23. The pin 11 is held axially in member 12 by means of two clips 13, 14 which have projections for being clamped into grooves 11a, 11b of the axle pin 11. A third groove 11c will receive another clip to mount the pin 11 on arm 5.

The second major component of the disk positioning assembly is a cup-shaped member or truncated cone 30 having a central bore 31 in a well or recessed portion 32. The well is located in a bottom or top 35 of member 30 and will receive the clip 14 as the bore 31 is traversed by one end of axle pin 11. The element 30 has a plurality of arms 33, each appearing as an angle piece having a short portion extending integrally from the bottom 35 of member 30 and continuing in an angled off arm at an angle of more than 90° on account of the overall trunkated conical configuration delineated by the arms.

Each arm has a foot portion 34 which in turn has a narrowed foot 36 with a radial retention lug 37. The narrow foot portion 36 each have dimensions to fit into the openings 24. Thus, the feet 36 are relatively far spaced from each other. On the other hand, arms 35 and foot portions 34 have only narrow gaps between them.

All the foot portions 34 are curved and together they delineate approximately a cylinder which is similar to the cylinder 22. However, it cannot be expected that in fact the outer surfaces of all foot portions are actually precisely situated on a cylinder unless the part were very acccurately machined. It is, however, much more economical to mold that part of plastic so that slight inaccuracies must be expected but they do not matter for reasons described below. Moreover, due to the molding, each of the arms 33 cannot be expected to have exactly the same resiliency in radial direction.

The third major component of the positioner assembly is a spring member 40 having a rather large central aperture 41 in an annulus 42 for receiving the exterior of well 32. Bent off arms 43 extend from the annulus 42, having foot portions 44 which can project through the openings 24 but shoulders 45 limit the degree of projection.

The positioner is assembled in that cup-shaped member 30 receives the metal member 40, the well 31 is stuck into opening 41, and the arms 33 are individually aligned with arms 43. More particularly, foot portions 44 are individually aligned with foot portions 36. These pairs of feet are placed into the openings 24 whereby lugs 37 grip around as shown in FIG. 3.

It can thus be seen that each one of the metal spring arms 43 urges one of the plastic arms 33 into abutment with the cylindrical surface 22 and here particular the edge 23 of the respective aperture 24. Therefor, all arms 33 are positioned on and along the cylinder 22 to closely define the contour of the cone 30 as it will engage the disk 1 adjacent to flange or hub 4. Each plastic arm 33, moreover, receives additional resiliency by the springyness of the respectively adjacent metal arm 43. Actually, the resiliency of the metal arm 43 dominates by far so that the resilient reaction of each and all arms 33 is primarily determined by the respective metal arms 43.

The diameter of the hub cylinder 4 is a trifle (a few thousands of an inch) smaller than the diameter of cylinder 22. Thus, as the cone 30 is urged into the hub 3, the latter deflects each of the arms 33 slightly in radial direction. These arms act resiliently by operation of metal arms 42 and against the edge of the aperture 1a of the disk 1 and thereby centrally positioning the flexible disk with respect to the axis of the hub 3. The uniform resiliency of the metal arms 43 under each plastic arm 33 ensures corresponding uniformity over the circumference of the positioning cone 30 as acting on the disk 1.

It can thus be seen that the invention combines accuracy of molding plastic parts as far as stationary dimensions is concerned with a much higher uniformity in spring constance of metal parts. The cylinder 22 and positioning edges 23 can readily be produced by molding, and these contours determine the circularity of the conical positioner proper, 30. That latter part is composed of the individual arms 33 which are forced into a uniform geometric (conical) contour through the feet 34 whereby each arm 33 may well require a slight radial inward flexing to permit retention of the feet 36 in apertures 24. This inward flexing, however, is not essential. Of course some flexing is needed initially to pass the lugs 37 through the openings 24. The fact that the metal arms 43 urge respective plastic cone feet into abutment with the respective edge determines and retains the resulting outer geometry of the positioning cone. On the other hand, any radial resiliency of the cone is primarily determined by the spring characteristics of each metal arm 43 underneath each cone arm.

The invention is not limited to the embodiment described above but all changes and modifications thereof not constituting departures from the spirit and scope of the invention are intended to be included.

I claim:

1. A positioner cone for positioning a flexible disk on a hub, comprising:
    a trunkated cone made of plastic and having individual, radially deflectible arms, extending obliquely in relation to an axis, an outer surface of each arm, being provided for engaging such a disk along an inner opening thereof:
    a disk with annularly arranged apertures for retaining said arms along a circle, thereby determining an outer contour of the cone as defined by said outer surfaces; and
    metal spring means received by the cone for biasing each said arms individually in radial outward direction.

2. A positioner cone as in claim 1, said trunkated cone having a base, and integral angled arms extending therefrom obliquely to define a conical contour with only narrow gaps between the arms, each arm having a foot portion having a partial cylindrical outer contour.

3. A positioner cone as in claim 2, said foot portion each having a narrow foot for insertion in an aperture of the disk.

4. A positioner cone as in claim 1 or 2 the metal spring means being an annular member from which extend spring arms individually engaging the arms of the plastic cone.

5. A positioner as in claim 1, 2 or 3 said feet each having a lug for gripping around the disk when inserted in an aperture thereof.

6. A positioner cone for cooperation with a driven hollow hub, sandwiching a flexible disk in between, comprising:
    an annular member made of molded plastic and having a plurality of apertures whose outer boundaries all are situated on an accurately predetermined circle;
    a conical hub member also made of molded plastic and having individual, obliquely positioned arms terminating in foot portions inserted in said apertures and individually held therein;
    a metal member having an annular portion and individual arms extending obliquely therefrom to delineate a trunkated cone, each of the metal arms having a foot position, the metal member being received in the hub member whereby the arms of the hub member align with the arms of the metal member, being also respectively inserted in said apertures, said arms of the metal member urging the arms of the hub member into abutment with the outer boundaries of the apertures and determining resilient reaction of the hub member; and
    means for journalling the annular member.

* * * * *